US012113889B2

(12) United States Patent
Moshkowich

(10) Patent No.: US 12,113,889 B2
(45) Date of Patent: Oct. 8, 2024

(54) COMPRESSION OF HOMOMORPHIC CIPHERTEXTS

(71) Applicant: International Business Machines Corporation, Armonk, NY (US)

(72) Inventor: Guy Moshkowich, Nes Ziyona (IL)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 17/717,093

(22) Filed: Apr. 10, 2022

(65) Prior Publication Data

US 2023/0327847 A1 Oct. 12, 2023

(51) Int. Cl.
*H04L 9/00* (2022.01)
*G06F 21/00* (2013.01)

(52) U.S. Cl.
CPC .............. *H04L 9/008* (2013.01); *G06F 21/00* (2013.01); *H04L 9/00* (2013.01)

(58) Field of Classification Search
CPC ............ H04L 9/008; H04L 9/00; G06F 21/00
See application file for complete search history.

(56) References Cited

U.S. PATENT DOCUMENTS

| 11,290,252 | B2 | 3/2022 | Carr | |
| 11,748,461 | B1 * | 9/2023 | Richter | G06F 21/31 |
| | | | | 705/44 |

| 2019/0386814 | A1 | 12/2019 | Ahmed | |
| 2020/0151356 | A1 * | 5/2020 | Rohloff | G06F 21/6245 |
| 2020/0403781 | A1 * | 12/2020 | Gentry | G06F 21/602 |
| 2021/0058229 | A1 | 2/2021 | Jiang | |
| 2021/0111865 | A1 | 4/2021 | Gentry | |

OTHER PUBLICATIONS

Choi et al., Compressed Oblivious Encoding for Homomorphically Encrypted Search, CCS '21, Nov. 15-19, 2021, Virtual Event, Republic of Korea, https://dl.acm.org/doi/abs/10.1145/3460120.3484792 (Year: 2021).*
Mozaffari et al., Heterogeneous Private Information Retrieval, Network and Distributed Systems Security (NDSS) Symposium 2020, Feb. 23-26, 2020 (Year: 2020).*
Angel S. et al., "PIR with Compressed Queries and Amortized Query Processing," IEEE Symposium on Security and Privacy (SP), pp. 962-979, May 20-24, 2018.

(Continued)

*Primary Examiner* — Robert B Leung
*Assistant Examiner* — Howard H. Louie
(74) *Attorney, Agent, or Firm* — Eric W. Chesley

(57) ABSTRACT

A computer-implemented method including: receiving a list of ciphertexts, wherein a majority of ciphertexts in the list homomorphically-encrypt zero values and a minority of ciphertexts in the list homomorphically-encrypt non-zero values; and compressing the list of ciphertexts to remove the ciphertexts which homomorphically-encrypt zero values, wherein: the compression is performed without knowledge on what each of the ciphertexts in the list encrypts, and the compression is based on homomorphic comparison of each of the ciphertexts in the list with a homomorphically-encrypted zero value, to determine which of the ciphertexts in the list to remove.

20 Claims, 5 Drawing Sheets

(56) References Cited

OTHER PUBLICATIONS

Brakerski Zvika, et al. "Leveraging linear decryption: Rate-1 fully-homomorphic encryption and time-lock puzzles." Theory of Cryptography Conference, (pp. 407-437), Nov. 2019.

Carpov S. et al., "Another compression method for homomorphic ciphertexts." Proceedings of the 4th ACM International Workshop on Security in Cloud Computing, pp. 44-50, May 2016.

Seung Geol Choi et al., "Compressed Oblivious Encoding for Homomorphically Encrypted Search"; Online at: https://arxiv.org/pdf/2109.07708.pdf, Sep. 16, 2021.

* cited by examiner

COMPRESSION OF HOMOMORPHIC CIPHERTEXTS

BACKGROUND

The invention relates to the fields of data compression and cryptography (particularly private information retrieval).

Private information retrieval (PIR) is a protocol that allows a client to retrieve information from a computerized database stored on a server, without revealing to the server what information is retrieved. Thus, the privacy of the client's information need is preserved.

One way to realize a PIR protocol is using homomorphic encryption—a type of encryption that allows computations to be made on encrypted data (a "ciphertext") without first decrypting it. These computations will yield the same results, when decrypted, as if they were performed on the same data in its unencrypted form (a "plaintext"). There are also some approximated homomorphic encryption schemes which, in favor of efficiency, integrally generate some noise (error) and thus yield approximately the same results—but not exactly the same results as if performed directly on the plaintext.

In homomorphic encryption, the encryption scheme includes an encryption operation that encrypts a vector of some fixed size, creating a ciphertext. Following computation, a decryption operation then retrieves the data from the resulting ciphertext. The encryption scheme generally ensures that any computations performed on the encrypted data will yield the same or approximately the same results as applying the same computations to the underlying unencrypted data.

This unique characteristic of homomorphic encryption makes it particularly useful in PIR. A database can be homomorphically encrypted and stored on a server—without the server being in possession of the secret key required to decrypt the data. Clients wishing to privately retrieve information from the database first encrypt their search query homomorphically, and then submit it to the server. The server then executes a search by comparing the encrypted search query against the database's encrypted contents, without the server being exposed to the plaintext underlying the encrypted search query. Thus, both the underlying (unencrypted, plaintext) search query and the underlying (unencrypted, plaintext) search results remain hidden from the server and known only to the client.

One of the challenges in such PIR protocol is the large communication overhead that is required for each search initiated by a client. Typically, a search is performed by computing homomorphic equality between the encrypted search query and the encrypted value in each database row; the result is an encryption of 1 if the encrypted search query exists in the row and an encryption of 0 otherwise (all while the server is unaware of course, whether each comparison result encodes 0 or 1). To assemble the results for transmission back to the client, for each row, this equality (1 or 0) is homomorphically multiplied by the row, and the result that is subsequently transmitted to the client is a list of ciphertexts of all products. The client decrypts the list and filters out the items whose plaintext is zero—as these pertain to database rows that included information irrelevant to the search query and were thus essentially replaced by zeros prior to retrieval.

Accordingly, if a database contains N rows, the response will contain a list of ciphertexts $\{c_i\}_{i=1}^N$, most of them typically encrypting the value 0 and a few relevant ones encrypting the value of a row. In other words, each simple information retrieval request by a client will cause an extremely large transmission back to the client, with much redundant content. This is a huge communication overhead compared to regular, non-private information retrieval schemes, where only relevant rows are transmitted back to the client.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment is directed to a computer-implemented method including: receiving a list of ciphertexts, wherein a majority of ciphertexts in the list homomorphically-encrypt zero values and a minority of ciphertexts in the list homomorphically-encrypt non-zero values; and compressing the list of ciphertexts to remove the ciphertexts which homomorphically-encrypt zero values, wherein: the compression is performed without knowledge on what each of the ciphertexts in the list encrypts, and the compression is based on homomorphic comparison of each of the ciphertexts in the list with a homomorphically-encrypted zero value, to determine which of the ciphertexts in the list to remove.

Another embodiment is directed to a system including: (a) at least one hardware processor; and (b) a non-transitory computer-readable storage medium having program code embodied therewith, the program code executable by said at least one processor to: receive a list of ciphertexts, wherein a majority of ciphertexts in the list homomorphically-encrypt zero values and a minority of ciphertexts in the list homomorphically-encrypt non-zero values; and compress the list of ciphertexts to remove the ciphertexts which homomorphically-encrypt zero values, wherein: the compression is performed without knowledge on what each of the ciphertexts in the list encrypts, and the compression is based on homomorphic comparison of each of the ciphertexts in the list with a homomorphically-encrypted zero value, to determine which of the ciphertexts in the list to remove.

A further embodiment is directed to a computer program product comprising a non-transitory computer-readable storage medium having program code embodied therewith, the program code executable by at least one hardware processor to: receive a list of ciphertexts, wherein a majority of ciphertexts in the list homomorphically-encrypt zero values and a minority of ciphertexts in the list homomorphically-encrypt non-zero values; and compress the list of ciphertexts to remove the ciphertexts which homomorphically-encrypt zero values, wherein: the compression is performed without knowledge on what each of the ciphertexts in the list encrypts, and the compression is based on homomorphic comparison of each of the ciphertexts in the list with a homomorphically-encrypted zero value, to determine which of the ciphertexts in the list to remove.

In some embodiments, the compression is performed by multiple compression passes, wherein: in each of the passes: (i) ciphertexts are divided into mutually-exclusive pairs, (ii) each ciphertext in each of the pairs is homomorphically compared with the homomorphically-encrypted zero value, to return a result comprising one of the following ciphertexts: (a) a homomorphic sum of the two ciphertexts in the pair if at least one of the ciphertexts in the pair equals the homomorphically-encrypted zero value, and (b) a concatenation of the ciphertexts in the pair if none of the ciphertexts in the pair equal the homomorphically-encrypted zero value, (iii) in the first pass, the ciphertexts that are divided into the mutually-exclusive pairs are all the ciphertexts in the list, and (iv) in each subsequent pass, the ciphertexts that are divided into the mutually-exclusive pairs are the ciphertexts that are returned as a result of the previous pass; and the passes cease to be performed when there is only one ciphertext returned as a result of a certain pass, wherein this one ciphertext encrypts a concatenation of all the ciphertexts in the list that homomorphically encrypt non-zero values.

In some embodiments, if, in any of the passes, there is an odd number of ciphertexts that are to be divided into the mutually-exclusive pairs, the respective pass further comprises, prior to the division: adding, to the ciphertexts that are to be divided into the mutually-exclusive pairs, a new ciphertext that homomorphically encrypts a zero value.

In some embodiments, if, in the first pass, there is an odd number of ciphertexts that are to be divided into the mutually-exclusive pairs, the first pass further comprises, prior to the division: adding, to the ciphertexts that are to be divided into the mutually-exclusive pairs, at least one new ciphertext that homomorphically encrypts a zero value, such that the number of ciphertexts following the addition is a power of two.

In some embodiments, the compression is performed by iterating over the ciphertexts in the list, wherein: prior to the first iteration, an accumulator is initialized with the homomorphically-encrypted zero value; in each iteration: (i) the respective ciphertext is homomorphically compared with the homomorphically-encrypted zero value, to return a result comprising one of the following ciphertexts: (a) a homomorphic sum of the respective ciphertext and a ciphertext in the accumulator if the respective ciphertext equals the homomorphically-encrypted zero value, and (b) a concatenation of the respective ciphertext and the ciphertext in the accumulator if the respective ciphertext is not equal to the homomorphically-encrypted zero value, and (ii) the accumulator is updated with the result, such that the accumulator includes a single ciphertext which is a compression of the ciphertexts iterated over so far; and when the iterations complete, the single ciphertext in the accumulator encrypts a concatenation of all the ciphertexts in the list that homomorphically encrypt non-zero values.

In some embodiments, in each iteration, when comparing the respective ciphertext with the homomorphically-encrypted zero value, the result that comprises the homomorphic sum of the respective ciphertext and the ciphertext in the accumulator is returned also if: the respective ciphertext homomorphically encrypts a non-zero value, and the ciphertext in the accumulator encrypts a zero, thereby preventing the single ciphertext in the accumulator from encrypting an unnecessary zero value before any subsequent non-zero values.

In some embodiments, the method is executed by a server, and wherein the method further comprises, at the server: receiving a homomorphically-encrypted search query from a client; based on the homomorphically-encrypted search query, executing a search in a database of homomorphically-encrypted rows, to output the list of ciphertexts; and transmitting the one ciphertext that is returned as a result of the last iteration to the client.

In some embodiments, the execution of the search comprises: computing homomorphic equality between the homomorphically-encrypted search query and each of the homomorphically-encrypted rows, wherein the ciphertexts in the output of the search comprise: for each row for which homomorphic equality exists: a ciphertext which encrypts a multiplication of the respective row by a homomorphically-encrypted value of one, for each row for which homomorphic equality does not exist: a ciphertext which encrypts a multiplication of the respective row by a homomorphically-encrypted value of zero.

In some embodiments, the method is executed by at least one processor of a computing device.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
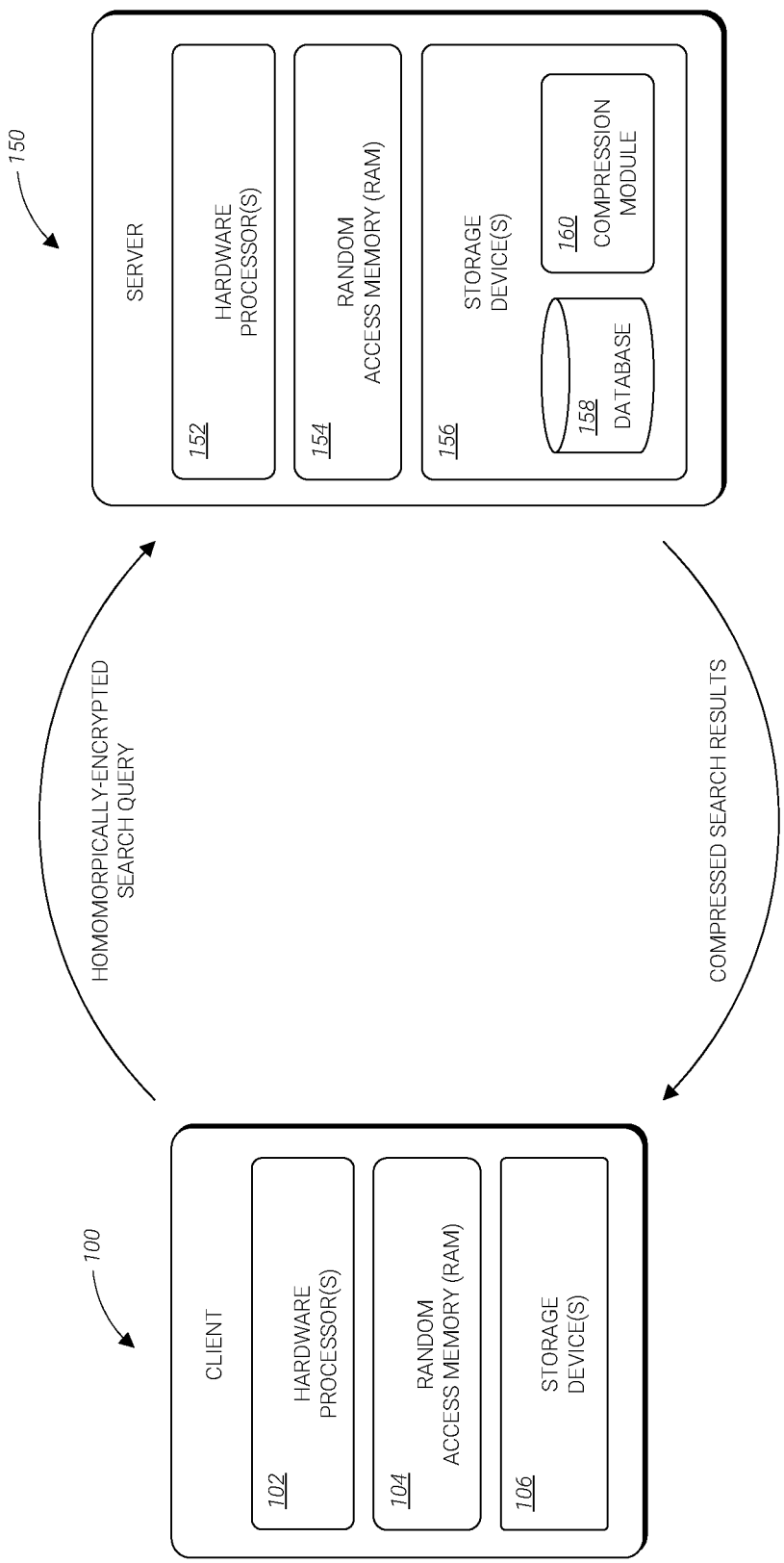
FIG. 1 is a block diagram of an exemplary client-server configuration, in accordance with an embodiment.

Disclosed herein is a technique, embodied as a method, a system, and a computer program product, for compression of a list of homomorphic ciphertexts $\{c_i\}_{i=1}^{N}$ in which most ciphertexts encode the value zero and a minority of ciphertexts encode a non-zero value. This is performed by intelligently filtering out those ciphertexts which encode zeros.

The disclosed technique may be advantageous in various types of computer systems which utilize homomorphic data storage and computation, and particularly in PIR systems. In such PIR systems, the technique may be used to compress the list of search results compiled by a search server before the list is transmitted back to the client, thereby greatly reducing the server-to-client communication overhead.

This compression may be performed, generally, in multiple passes, each including a division of the list of search results into pairs $\{(c_i, c_{i+1}), \ldots, (c_{n-1}, c_n)\}$, and a homomorphic comparison of each ciphertext in each of the pairs with a ciphertext which encodes a zero (which may be provided by the client or encrypted by the server using a public key)—returning a result which is either (a) a homomorphic sum of the two ciphertexts in the pair if at least one of them equals the client-provided ciphertext, and (b) a concatenation of the ciphertexts in the pair if none of them equal the client-provided ciphertext. The result of each pass is therefore:

an encoded zero if both ciphertexts in the pair encode zeros, the first ciphertext of the pair if it is the only one encrypting a non-zero value, the second ciphertext of the pair if it is the only one encrypting a non-zero value, or a single ciphertext which is a concatenation of both ciphertexts of the pair, if they both encrypt non-zero values.

All four scenarios involve homomorphic arithmetic operations that eventually yield a single ciphertext out of a pair of ciphertexts. As the size of each ciphertext is fixed, as known in the field of homomorphic encryption, this clearly results in a compression. It can also be immediately seen that each pass compresses the list of search results by half (exactly half if there is an even number of search results, and approximately half if the number is odd; this issue is further discussed below).

Next, each subsequent pass uses, as input, the ciphertexts resulting from the previous pass, such that the length of the list continues to decrease by half with each pass.

The passes cease when, at a certain pass, only one ciphertext is returned as a result. This single ciphertext is then transmitted back to the client, and is in effect a concatenation of all those ciphertexts of the search results which encode non-zero values. The client can then decrypt the ciphertext, parse it (such as by separating it to its constituent, distinct search results), and observe its contents.

Because, typically, search results in a PIR system encrypt mostly zeroes, it is expected that the first three scenarios listed above (in which at least one member of the pair encodes a zero) will be much more prevalent than the fourth scenario (in which both members encode non-zero values). Hence, overall, the present technique achieves substantial compression of the search results that have to be transmitted to the client, because transmission of ciphertexts which merely encode zeros is avoided.

It should be noted that in the present disclosure the terms "encrypt" and "encode" are used interchangeably and are intended to have the same meaning. The same rationale applies to the opposite terms, "decrypt" and "decode."

Reference is now made to FIG. 1, which shows a block diagram of a client-server configuration, in accordance with an embodiment. This configuration includes a PIR server 150 (also referred to as a "system"), which, beyond a conventional PIR capability, has the added functionality of being able to compress a list of homomorphic ciphertexts resulting from an executed search, and to then transmit the compressed list to a client 100 which initiated the search.

Each of client 100 and server 150 may be a computing device which conventionally includes, respectively, one or more hardware processor(s) 102 or 152, a random-access memory (RAM) 104 or 154, and one or more non-transitory computer-readable storage device(s) 106 or 156.

In client 100, storage device(s) 106 may have stored thereon program instructions configured to operate hardware processor(s) 102 so as to enable the client, or a human user of the client, to transmit data to server 150, to receive data from the server, as well as to perform homomorphic encryption and/or decryption. In addition, storage device(s) 106 may have stored thereon an operating system having various software components and/or drivers for controlling and managing general system tasks (e.g., memory management, storage device control, power management, etc.), and facilitating communication between various hardware and software components.

Client 100 may operate by loading the program instructions stored in storage device(s) 106 into RAM 104 as they are being executed by processor(s) 102.

In server 150, storage device(s) 156 may have stored thereon program instructions configured to operate hardware processor(s) 152. Some of these program instructions may be embodied in a compression module 160, and some may form a database (essentially, a database management system) 158. It is also possible for database 158 to be stored in another computing device (not shown) which maintains communication with server 150. In addition, storage device(s) 156 may have stored thereon program instructions configured to perform conventional PIR, namely—a search engine employing homomorphic search capabilities. Further, storage device(s) 156 may have stored thereon an operating system having various software components and/or drivers for controlling and managing general system tasks (e.g., memory management, storage device control, power management, etc.), and facilitating communication between various hardware and software components.

Server 150 may operate by loading the program instructions stored in storage device(s) 156 into RAM 154 as they are being executed by processor(s) 152.

The instructions of compression module 160 may cause server 150 to obtain a homomorphically-encrypted zero, while the instructions that are configured to perform conventional PIR may cause the server to receive, from the client, a homomorphically-encrypted search query.

Server 150 may then perform a conventional PIR search in database 158, whose result, as known in the art, is a concatenated list of ciphertexts—most of which encrypt just a value of zero, and a small minority of which encrypt a value of a row from database 158.

Compression module 160 may then kick into action. Its instructions compress the concatenated list of results produced by the conventional PIR search, to effectively remove all ciphertexts encoding zeros. Then, compression module 160 outputs the compressed list for transmission back to client 100. The operation of compression module 160 is described in further detail below.

Each of client 100 and server 150, as described herein, is only an exemplary embodiment of the present invention, and in practice may be implemented in hardware only, software only, or a combination of both hardware and software. Each of client 100 and server 150 may have more or fewer components and modules than shown, may combine two or more of the components, or may have a different configuration or arrangement of the components. Each of client 100 and server 150 may include any additional component enabling it to function as an operable computer system, such as a motherboard, data busses, power supply, a network interface card, a display, an input device (e.g., keyboard, pointing device, touch-sensitive display), etc. (not shown). Moreover, components of each of client 100 and server 150 may be co-located or distributed among separate computerized devices (each having its own RAM, processor, and storage device(s), and configured to communicate with the other computerized devices), or the server/client may be configured to run as one or more cloud computing "instances," "containers," "virtual machines," or other types of encapsulated software applications, as known in the art.

Relevant instructions stored in storage device(s) 156, such as those of compression module 160 and others, are now further discussed with reference to the flowchart of FIG. 2, which illustrates a method 200 for compressing a list of homomorphic ciphertexts $\{c_i\}_{i=1}^{N}$ in which, typically, a majority of ciphertexts encode the value zero and a minority of ciphertexts encode a non-zero value.

Although method 200 is described in the context of PIR, it is explicitly intended for those steps of this method which are not PIR-related to be usable in other contexts in which compression of a list of homomorphic ciphertexts is desired, even if the list was not the result of a homomorphic search.

Steps of method 200 may either be performed in the order they are presented or in a different order (or even in parallel), as long as the order allows for a necessary input to a certain step to be obtained from an output of an earlier step. In addition, the steps of method 200 are performed automatically (e.g., by server 150 of FIG. 1 or a similar computing device), unless specifically stated otherwise.

In a step 202, a homomorphically-encrypted search query may be received from a client, such as client 100 of FIG. 1.

In a step 204, a conventional homomorphic search (sometimes termed a "PIR search") may be executed in a database of homomorphically-encrypted rows (such as database 158 of FIG. 1) based on the received homomorphically-encrypted search query.

The execution of the search may include, as known in the art, computing homomorphic equality between the homomorphically-encrypted search query and each of the homomorphically-encrypted rows, such that the output of the search includes a list of ciphertexts 206. As discussed above, in a typical search only a small fraction of a database's contents are relevant to the search query, meaning that only a small fraction of rows will be equal to the search query. The ciphertexts in list 206 therefore include:

For each row for which homomorphic equality with the search query exists: a ciphertext which encrypts a multiplication of the respective row by a homomorphically-encrypted value of one. Namely, every row which is relevant to the search query will remain intact.

For each row for which homomorphic equality with the search query does not exist: a ciphertext which encodes a multiplication of the respective row by a homomorphically-encrypted value of zero. Namely, every row which is irrelevant to the search query will be represented by a homomorphically-encrypted zero.

The computing device which executes step 204 (such as server 150 of FIG. 1) is of course unaware whether each computation of homomorphic equality yields an encrypted row value or an encrypted zero.

In a step 208, a homomorphically-encrypted zero value may be obtained, for example by encrypting it at the server using a public key or by receiving it from the same entity (e.g., client 100 of FIG. 1) which provided the homomorphically-encrypted search query. It should be noted that step 208 may alternatively be performed earlier, for instance immediately before or after the receipt of the search query in step 202.

Then, the ciphertexts which encrypt the value zero may be removed from list 206 by performing multiple compression passes, each involving steps 210 through 212:

In a step 210, list 206 (if this is the first pass) or the result of the previous pass (if this is the second or later pass) may be divided into mutually-exclusive pairs of ciphertexts (in the first pass: $\{(c_i, c_{i+1}), \ldots, (c_{n-1}, c_n)\}$).

In case list 206 (in the first pass) or the result of the previous pass (in the second and subsequent passes) happens to include an odd number of ciphertexts, it cannot, of course, be divided into pairs. In such case the list/result may be evened by padding it with a meaningless ciphertext, namely—adding to it a new ciphertext encrypting the value zero, such as the homomorphically-encrypted zero obtained in step 208. Alternatively, to avoid the need to perform such padding every few passes (whenever the number of ciphertexts in the results becomes odd), list 206 may initially, before the first pass, be padded with at least one homomorphically-encrypted zero such that the number of ciphertexts in the list, following this addition, is a power of two. This will ensure that each and every subsequent pass will be performed on an even number of ciphertexts.

In a step 212, each ciphertext in each of the pairs may be homomorphically compared with the homomorphically-encrypted zero which was obtained 208, to return one of the following results:

If at least one of the ciphertexts in the pair equals the homomorphically-encrypted zero, a homomorphic sum of the two ciphertexts is returned 212a. If both ciphertexts in the pair equal the homomorphically-encrypted zero, this will be a homomorphically-encrypted zero (because 0+0=0). If only one of the two ciphertexts encrypt zero, this will be the other, non-zero ciphertext (because X+0=X).

If none of the ciphertexts in the pair equals the homomorphically-encrypted zero, a concatenation of the ciphertexts in the pair is returned 212b, as a single ciphertext.

Figure 3:
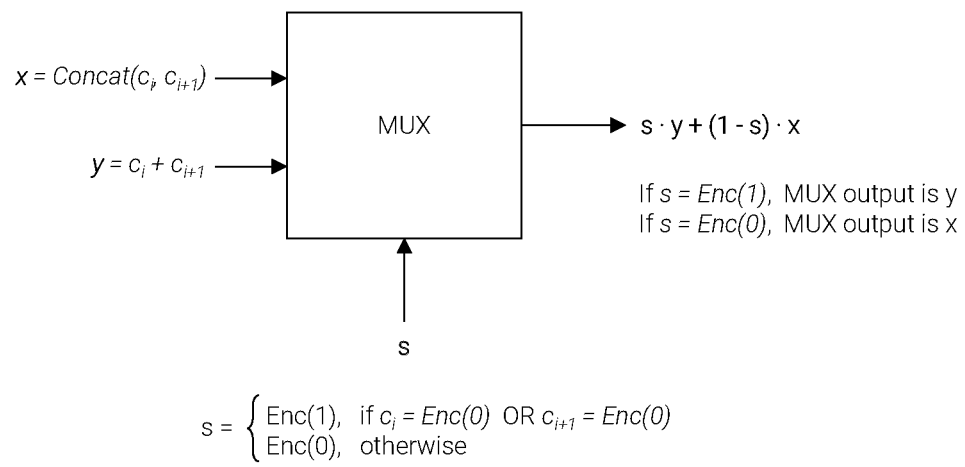
FIG. 3 is an illustration of a multiplexer used to compress a pair of homomorphic ciphertexts, according to an embodiment.

Technically, step 212 may be performed using homomorphic computations only, since "if" and "else" conditions are not typically possible in the computational processing of homomorphic ciphertexts. Interim reference is made to FIG. 3, illustrating a conceptual multiplexer (MUX) which may aid in the understanding of how homomorphic computations only may enable outputting, from step 212, the homomorphic sum of the two ciphertexts (if at least one of the ciphertexts in the pair equals the homomorphically-encrypted zero) or the concatenation of the ciphertexts in the pair (if none of the ciphertexts in the pair equal the homomorphically-encrypted zero).

The two inputs to the multiplexer are x and y, where x is a concatenation of the two ciphertexts in the pair (Concat($c_i$, $c_{i+1}$)) and y is their sum ($c_i + c_{i+1}$). A homomorphic summing (addition) operation is of course readily available as a homomorphic computation. A concatenation operation, in turn, is achievable by homomorphically multiplying the first ciphertext by a certain value which will cause the numerals of the ciphertext to shift left, and then homomorphically adding this shifted ciphertext to the other ciphertext in the pair.

The selector of the multiplexer, s, decides on the output. The value of the selector, a homomorphically-encrypted 0 or 1, is the result of the homomorphic comparison of each ciphertext in the pair with the homomorphically-encrypted zero: if they are homomorphically equal, the result is 1; if they are not, the result is 0. Of course, the result of each of these two discrete comparisons is in itself an encryption of 0 or a 1. To output that single 0 or 1 result, which indicates whether at least one of the two ciphertexts equals the homomorphically-encrypted zero, the results of these two discrete comparisons may be homomorphically multiplied by one another, which will naturally yield an encrypted 0 if at least one of them encrypts 0.

The output of the multiplexer may be the term s·y+(1−s)·x (or any arithmetically-equal term), which is readily computable using homomorphic multiplication, addition, and subtraction operations, such that if s=Enc(1) (meaning that at least one ciphertext equals the homomorphically-encrypted zero), the multiplexer output will be y (the sum of the pair); and if s=Enc(0) (meaning that none of the ciphertexts equal the homomorphically-encrypted zero), the output will be x (the concatenation of the pair).

In sum, step 212 may be performed by the following sequence of homomorphic computations: First, homomorphic equality between the homomorphically-encrypted zero and each of the ciphertexts in the pair is computed, to output a homomorphically-encrypted 1 (equal) or 0 (unequal). Second, the term $s \cdot y+(1-s) \cdot x$ is solved, which involves first computing x (by the above-mentioned multiplication/shifting technique) and y (by summing the two ciphertexts). The solution of this term is the ciphertext that results from step 212.

These compression passes, each including steps 210 through 212, continue until there is only one ciphertext returned as a result of a certain pass.

The result of the last pass, therefore, is a single ciphertext which is a concatenation of those of the search results 206 which include, by virtue of steps 210 through 212, only ciphertexts which encode relevant rows from the database, and not ciphertext which merely encode zeros.

It should be noted that the last pass is performed over just two ciphertexts, and therefore the division into pairs at this pass may be regarded as merely semantic.

Finally, in a step 214, the result of the last pass may be transmitted from the server back to the client. Advantageously, the amount of data included in this transmission is orders of magnitude lesser than conventional PIR techniques in which numerous ciphertexts which merely encode zeroes plus very few ciphertexts which encode non-zero values, are transmitted.

The client may then decrypt the transmission and observe the underlying search results.

Figure 4:
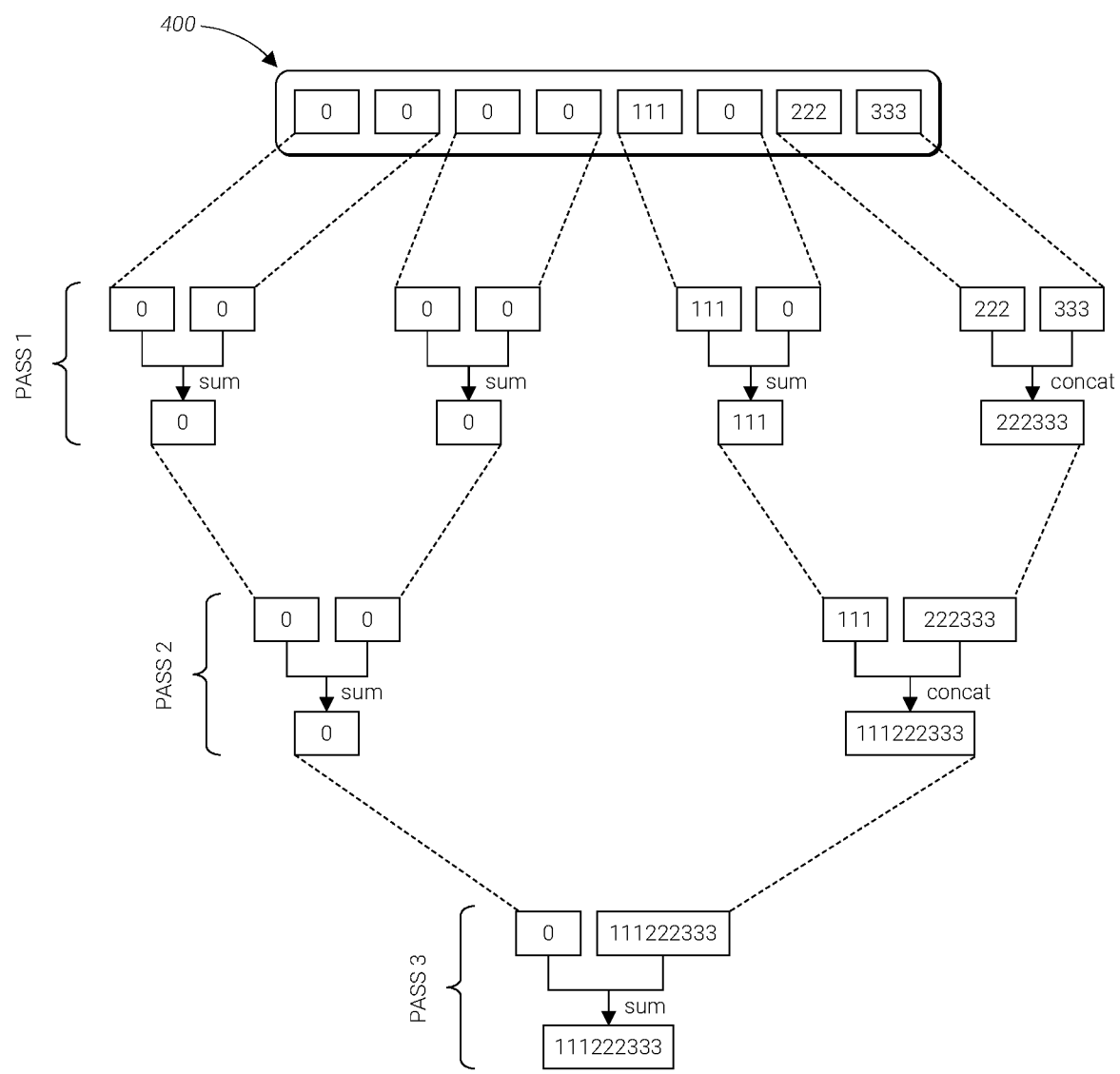
FIG. 4 is a flowchart illustrating a simplistic, exemplary scenario of compression of search results, according to an embodiment.

Reference is now made to FIG. 4, which is a flowchart illustrating a simplistic, exemplary scenario of compressing search results 400 that include eight ciphertexts. Needless to say, in real scenarios of PIR, search results includes numerous ciphertexts, the same number of rows in the database.

In FIG. 4, to facilitate better understanding, each ciphertext is shown as a rectangle labeled with the decoded value of that ciphertext. The decoded values of the eight exemplary ciphertexts are therefore 0, 0, 0, 0, 111, 0, 222, and 333. This resembles a typical scenario in which only a minority of search results do not encrypt zeros.

In the first pass, the eight ciphertexts of the search results 400 are divided into four pairs, which become compressed into four ciphertexts: 0, 0, 111, and 222333.

In the second pass, the four ciphertexts are divided into two pairs, which become compressed into two ciphertexts: 0 and 111222333.

In the third and last pass, the two ciphertexts are already a pair, and they become compressed into a single ciphertext: 111222333. The performance of the passes ceases now, as there is only one ciphertext output by the third pass.

111222333, therefore, is the result of the last pass, which is transmitted back to the client. It can easily be seen, even in this simplistic example, that employing the compression technique of the present disclosure yields substantial compression of the original list of ciphertexts—from eight to just one. Accordingly, assuming that the length of each ciphertext is fixed (regardless what it encodes), reducing eight ciphertexts to just one means an 8:1 compression ratio.

Figure 2:
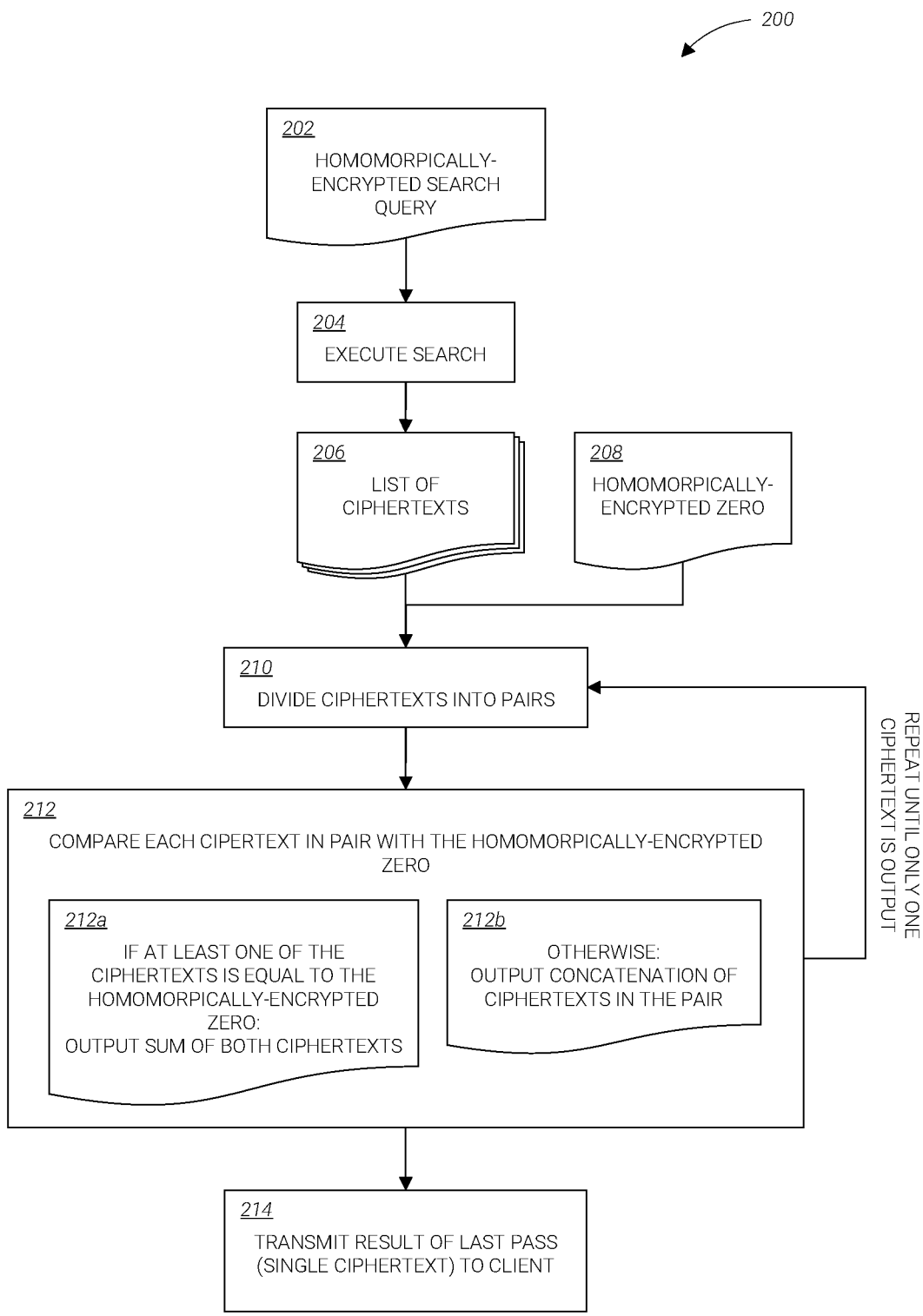
FIG. 2 is a flowchart of a method for compressing a list of homomorphic ciphertexts, according to an embodiment.

An alternative compression method, which may be used instead of steps 210-212 (the compression passes) of FIG. 2, is also provided in accordance with an embodiment. This alternative method may involve iterating over the ciphertexts in the list one by one, and, in each iteration, updating an accumulator (a variable stored in memory) so that it includes a single ciphertext which is a compression of the ciphertexts iterated over so far. When iteration over all ciphertexts in the list completes, the accumulator will include a single ciphertext devoid of any encrypted zero. This single ciphertext may then be transmitted to the client.

More specifically, this alternative compression method may include:

Prior to the first iteration, initializing the accumulator with the homomorphically-encrypted zero which was obtained.

Then, in each iteration:

First, homomorphically comparing the respective ciphertext with the homomorphically-encrypted zero. The result is a homomorphically-encrypted 1 if they are equal and 0 if not.

Second, solving the term $s \cdot y+(1-s) \cdot x$ (or any arithmetically-equal term), which involves first computing x (by the above-mentioned multiplication/shifting technique, applied to the respective ciphertext and to the ciphertext in the accumulator) and y (by summing respective ciphertext and the ciphertext in the accumulator). The resulting solution of this term is updated as the new value of the accumulator, which is used in the subsequent iteration.

Figure 5:
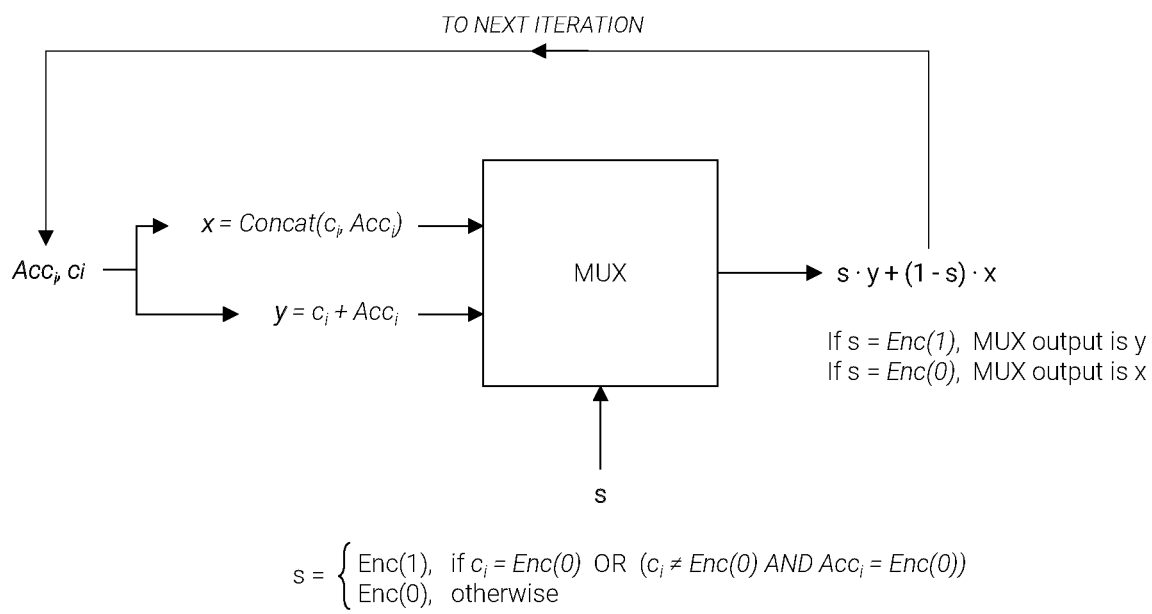
FIG. 5 is an illustration of a multiplexer used to compress a ciphertexts together with the contents of an accumulator, according to an embodiment

Reference is made to FIG. 5, illustrating a conceptual multiplexer (MUX) which may aid in the understanding of how homomorphic computations only may enable the alternative method discussed above, by outputting a result which is the homomorphic sum of the respective ciphertext and the ciphertext in the accumulator (if the respective ciphertext equals the homomorphically-encrypted zero) or the concatenation of the respective ciphertext and the ciphertext in the accumulator (if the respective ciphertext equals the homomorphically-encrypted zero).

The two inputs to the multiplexer are x and y, where x is a concatenation of the respective ciphertext and the ciphertext in the accumulator (Concat($c_i$, $Acc_i$)) and y is their sum ($c_i$+$Acc_i$). As discussed above, a homomorphic summing (addition) operation is readily available as a homomorphic computation, and a concatenation operation, in turn, is achievable by homomorphically multiplying the first ciphertext by a certain value which will cause the numerals of the ciphertext to shift left, and then homomorphically adding this shifted ciphertext to the other ciphertext in the pair.

The selector of the multiplexer, s, decides on the output. The value of the selector, a homomorphically-encrypted 0 or 1, is the result of the homomorphic comparison of the respective ciphertext with the homomorphically-encrypted zero: if they are homomorphically equal, the result is 1; if they are not, the result is 0.

The output of the multiplexer may be the term $s \cdot y+(1-s) \cdot x$, which is readily computable using homomorphic multiplication, addition, and subtraction operations, such that if s=Enc(1) (meaning that the respective ciphertext equals the homomorphically-encrypted zero), the multiplexer output will be y (the sum of the respective ciphertext and the ciphertext in the accumulator); and if s=Enc(0) (meaning that the respective ciphertext does not equal the homomorphically-encrypted zero), the output will be x (the concatenation of the respective ciphertext and the ciphertext in the accumulator).

Optionally, to prevent the ciphertext in the accumulator from encoding an unnecessary zero before any subsequent non-zero values, the following may be performed: s (the value of the selector) may be set to 1 not only if $c_i$=Enc(0) as mentioned above (when the respective ciphertext equals the homomorphically-encrypted zero), but also if $c_i \neq$Enc(0) AND $Acc_i$=Enc(0). Namely, when the respective ciphertext encodes a non-zero value, and the ciphertext in the accumulator encodes a zero, s will be 0; this will cause the MUX to output y ($c_i$+$Acc_i$), which will omit the zero and leave just the non-zero value encoded in the ciphertext of the accumulator.

In conclusion, disclosed above were two alternative methods for compressing a list of homomorphic ciphertexts, without knowledge by the computing device and/or the algorithm performing the compression as to what each of the ciphertexts in the list encrypt. This is achieved by basing the various homomorphic computations in these methods on homomorphic comparison of each of the ciphertexts in the list with a homomorphically-encrypted zero value. The two methods ensure that secrecy of the ciphertexts in the list is maintained at the server side, and only the client who requested the list (such as by submitting a homomorphically-encrypted search query) can become aware of the contents of the ciphertexts in the (compressed) list later, when receiving and decrypting it using a private key possessed only by the client.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, a field-programmable gate array (FPGA), or a programmable logic array (PLA) may execute the computer readable program instructions by utilizing state information of the computer readable program instructions to personalize the electronic circuitry, in order to perform aspects of the present invention. In some embodiments, electronic circuitry including, for example, an application-specific integrated circuit (ASIC), may be incorporate the computer readable program instructions already at time of fabrication, such that the ASIC is configured to execute these instructions without programming.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the description and claims, each of the terms "substantially," "essentially," and forms thereof, when describing a numerical value, means up to a 20% deviation (namely, ±20%) from that value. Similarly, when such a term describes a numerical range, it means up to a 20% broader range–10% over that explicit range and 10% below it).

In the description, any given numerical range should be considered to have specifically disclosed all the possible subranges as well as individual numerical values within that range, such that each such subrange and individual numerical value constitutes an embodiment of the invention. This applies regardless of the breadth of the range. For example, description of a range of integers from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 4, and 6. Similarly, description of a range of fractions, for example from 0.6 to 1.1, should be considered to have specifically disclosed subranges such as from 0.6 to 0.9, from 0.7 to 1.1, from 0.9 to 1, from 0.8 to 0.9, from 0.6 to 1.1, from 1 to 1.1 etc., as well as individual numbers within that range, for example 0.7, 1, and 1.1.

The descriptions of the various embodiments of the present invention have been presented for purposes of illustration, but are not intended to be exhaustive or limited to the explicit descriptions. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise," "include," and "have," as well as forms thereof, are not necessarily limited to members in a list with which the words may be associated.

Where there are inconsistencies between the description and any document incorporated by reference or otherwise relied upon, it is intended that the present description controls.

What is claimed is:

1. A computer-implemented method comprising:
receiving a list of ciphertexts, wherein a majority of ciphertexts in the list of ciphertexts homomorphically-encrypt zero values and a minority of ciphertexts in the list of ciphertexts homomorphically-encrypt non-zero values; and
compressing the list of ciphertexts to remove ciphertexts which homomorphically-encrypt zero values, wherein:
the compression is performed without knowledge on what each ciphertext in the list of ciphertexts encrypts, and
the compression is based on homomorphic comparison of each ciphertext in the list of ciphertexts with a homomorphically-encrypted zero value, to determine which of the ciphertexts in the list of ciphertexts to remove.

2. The method of claim 1, wherein the compression is performed by multiple compression passes, wherein:
in each of the compression passes:
the ciphertexts in the list of ciphertexts are divided into mutually-exclusive pairs,
each ciphertext in each of the mutually-exclusive pairs is homomorphically compared with the homomorphically-encrypted zero value, to return a result comprising one of the following ciphertexts: (a) a homomorphic sum of two ciphertexts in a mutually-exclusive pair if at least one of the ciphertexts in the mutually-exclusive pair equals the homomorphically-encrypted zero value, and (b) a concatenation of the ciphertexts in the mutually-exclusive pair if none of the ciphertexts in the mutually-exclusive pair equal the homomorphically-encrypted zero value, and
in a first pass, the ciphertexts in the list of ciphertexts that are divided into the mutually-exclusive pairs are all ciphertexts in the list of ciphertexts, and
in each subsequent pass, the ciphertexts in the list of ciphertexts that are divided into the mutually-exclusive pairs are ciphertexts that are returned as a result of a previous pass; and
the compression passes cease to be performed when there is only one ciphertext returned as a result of a certain pass, wherein this one ciphertext encrypts a concatenation of all the ciphertexts in the list of ciphertexts that homomorphically encrypt non-zero values.

3. The method of claim 2, wherein:
if, in any of the compression passes, there is an odd number of ciphertexts that are to be divided into the mutually-exclusive pairs, the respective pass further comprises, prior to the division:
adding, to the ciphertexts that are to be divided into the mutually-exclusive pairs, a new ciphertext that homomorphically encrypts a zero value.

4. The method of claim 2, wherein:
if, in the first pass, there is an odd number of ciphertexts that are to be divided into the mutually-exclusive pairs, the first pass further comprises, prior to the division:
adding, to the ciphertexts that are to be divided into the mutually-exclusive pairs, at least one new ciphertext that homomorphically encrypts a zero value, such that the number of ciphertexts following the addition is a power of two.

5. The method of claim 1, wherein the compression is performed by iterating over ciphertexts in the list of ciphertexts, wherein:
prior to a first iteration, an accumulator is initialized with the homomorphically-encrypted zero value;
in each iteration:
a respective ciphertext is homomorphically compared with the homomorphically-encrypted zero value, to return a result comprising one of the following ciphertexts: (a) a homomorphic sum of the respective ciphertext and a ciphertext in the accumulator if the respective ciphertext equals the homomorphically-encrypted zero value, and (b) a concatenation of the respective ciphertext and the ciphertext in the accumulator if the respective ciphertext is not equal to the homomorphically-encrypted zero value, and the accumulator is updated with the result, such that the accumulator includes a single ciphertext which is a compression of the ciphertexts iterated over so far; and when the iterations complete, the single ciphertext in the accumulator encrypts a concatenation of all the ciphertexts in the list of ciphertexts that homomorphically encrypt non-zero values.

6. The method of claim 5, wherein:
in each iteration, when comparing the respective ciphertext with the homomorphically-encrypted zero value, the result that comprises the homomorphic sum of the respective ciphertext and the ciphertext in the accumulator is returned also if:
the respective ciphertext homomorphically encrypts a non-zero value, and the ciphertext in the accumulator encrypts a zero,
thereby preventing the single ciphertext in the accumulator from encrypting an unnecessary zero value before any subsequent non-zero values.

7. The method of claim 1, wherein the method is executed by a server, and wherein the method further comprises, at the server:
receiving a homomorphically-encrypted search query from a client;
based on the homomorphically-encrypted search query, executing a search in a database of homomorphically-encrypted rows, to output the list of ciphertexts; and
transmitting a ciphertext that is returned as a result of a last iteration to the client.

8. The method of claim 7, wherein the execution of the search comprises:
computing homomorphic equality between the homomorphically-encrypted search query and each of the homomorphically-encrypted rows,
wherein ciphertexts in the output of the search comprise:
for each row for which the homomorphic equality exists: a ciphertext which encrypts a multiplication of the respective row by a homomorphically-encrypted value of one,
for each row for which the homomorphic equality does not exist: a ciphertext which encrypts a multiplication of the respective row by a homomorphically-encrypted value of zero.

9. The method of claim 1, executed by at least one processor of a computing device.

10. A system comprising:
at least one hardware processor; and
a non-transitory computer-readable storage medium having program code embodied therewith, the program code executable by said at least one hardware processor to:
receive a list of ciphertexts, wherein a majority of ciphertexts in the list of ciphertexts homomorphically-encrypt zero values and a minority of ciphertexts in the list of ciphertexts homomorphically-encrypt non-zero values; and
compress the list of ciphertexts to remove ciphertexts which homomorphically-encrypt zero values, wherein:
the compression is performed without knowledge on what each ciphertext in the list of ciphertexts encrypts, and
the compression is based on homomorphic comparison of each ciphertext in the list of ciphertexts with a homomorphically-encrypted zero value, to determine which of the ciphertexts in the list of ciphertexts to remove.

11. The system of claim 10, wherein the compression is performed by multiple compression passes, wherein:
in each of the compression passes:
the ciphertexts in the list of ciphertexts are divided into mutually-exclusive pairs,
each ciphertext in each of the mutually-exclusive pairs is homomorphically compared with the homomorphically-encrypted zero value, to return a result comprising one of the following ciphertexts: (a) a homomorphic sum of two ciphertexts in a mutually-exclusive pair if at least one of the ciphertexts in the mutually-exclusive pair equals the homomorphically-encrypted zero value, and (b) a concatenation of the ciphertexts in the mutually-exclusive pair if none of the ciphertexts in the mutually-exclusive pair equal the homomorphically-encrypted zero value, and
in a first pass, the ciphertexts in the list of ciphertexts that are divided into the mutually-exclusive pairs are all ciphertexts in the list of ciphertexts, and
in each subsequent pass, the ciphertexts in the list of ciphertexts that are divided into the mutually-exclusive pairs are ciphertexts that are returned as a result of a previous pass; and
the compression passes cease to be performed when there is only one ciphertext returned as a result of a certain pass, wherein this one ciphertext encrypts a concatenation of all the ciphertexts in the list of ciphertexts that homomorphically encrypt non-zero values.

12. The system of claim 11, wherein:
if, in any of the compression passes, there is an odd number of ciphertexts that are to be divided into the mutually-exclusive pairs, the respective pass further comprises, prior to the division:
adding, to the ciphertexts that are to be divided into the mutually-exclusive pairs, a new ciphertext that homomorphically encrypts a zero value.

13. The system of claim 11, wherein:
if, in the first pass, there is an odd number of ciphertexts that are to be divided into the mutually-exclusive pairs, the first pass further comprises, prior to the division:
adding, to the ciphertexts that are to be divided into the mutually-exclusive pairs, at least one new ciphertext that homomorphically encrypts a zero value, such that the number of ciphertexts following the addition is a power of two.

14. The system of claim 10, wherein the compression is performed by iterating over the ciphertexts in the list of ciphertexts, wherein:
prior to a first iteration, an accumulator is initialized with the homomorphically-encrypted zero value;
in each iteration:
a respective ciphertext is homomorphically compared with the homomorphically-encrypted zero value, to return a result comprising one of the following ciphertexts: (a) a homomorphic sum of the respective ciphertext and a ciphertext in the accumulator if the respective ciphertext equals the homomorphically-encrypted zero value, and (b) a concatenation of the respective ciphertext and the ciphertext in the accumulator if the respective ciphertext is not equal to the homomorphically-encrypted zero value, and the accumulator is updated with the result, such that the accumulator includes a single ciphertext which is a compression of the ciphertexts iterated over so far; and when the iterations complete, the single ciphertext in the accumulator encrypts a concatenation of all the ciphertexts in the list of ciphertexts that homomorphically encrypt non-zero values.

15. The system of claim 14, wherein:

in each iteration, when comparing the respective ciphertext with the homomorphically-encrypted zero value, the result that comprises the homomorphic sum of the respective ciphertext and the ciphertext in the accumulator is returned also if:

the respective ciphertext homomorphically encrypts a non-zero value, and the ciphertext in the accumulator encrypts a zero, thereby preventing the single ciphertext in the accumulator from encrypting an unnecessary zero value before any subsequent non-zero values.

16. The system of claim 10, wherein the system is a server, and wherein the program code is further executable, by the server, to:

receive a homomorphically-encrypted search query from a client;

based on the homomorphically-encrypted search query, execute a search in a database of homomorphically-encrypted rows, to output the list of ciphertexts; and transmit a ciphertext that is returned as a result of a last iteration to the client.

17. The system of claim 16, wherein the execution of the search comprises:

computing homomorphic equality between the homomorphically-encrypted search query and each of the homomorphically-encrypted rows, wherein ciphertexts in the output of the search comprise:

for each row for which the homomorphic equality exists: a ciphertext which encrypts a multiplication of the respective row by a homomorphically-encrypted value of one, for each row for which the homomorphic equality does not exist: a ciphertext which encrypts a multiplication of the respective row by a homomorphically-encrypted value of zero.

18. A computer program product comprising a non-transitory computer-readable storage medium having program code embodied therewith, the program code executable by at least one hardware processor to:

receive a list of ciphertexts, wherein a majority of ciphertexts in the list of ciphertexts homomorphically-encrypt zero values and a minority of ciphertexts in the list of ciphertexts homomorphically-encrypt non-zero values; and compress the list of ciphertexts to remove ciphertexts which homomorphically-encrypt zero values, wherein:

the compression is performed without knowledge on what each ciphertext in the list of ciphertexts encrypts, and the compression is based on homomorphic comparison of each ciphertext in the list of ciphertexts with a homomorphically-encrypted zero value, to determine which of the ciphertexts in the list of ciphertexts to remove.

19. The computer program product of claim 18, wherein the compression is performed by multiple compression passes, wherein:

in each of the compression passes:

the ciphertexts in the list of ciphertexts are divided into mutually-exclusive pairs, each ciphertext in each of the mutually-exclusive pairs is homomorphically compared with the homomorphically-encrypted zero value, to return a result comprising one of the following ciphertexts: (a) a homomorphic sum of two ciphertexts in a mutually-exclusive pair if at least one of the ciphertexts in the mutually-exclusive pair equals the homomorphically-encrypted zero value, and (b) a concatenation of the ciphertexts in the mutually-exclusive pair if none of the ciphertexts in the mutually-exclusive pair equal the homomorphically-encrypted zero value, and in a first pass, the ciphertexts in the list of ciphertexts that are divided into the mutually-exclusive pairs are all ciphertexts in the list of ciphertexts, and in each subsequent pass, the ciphertexts in the list of ciphertexts that are divided into the mutually-exclusive pairs are ciphertexts that are returned as a result of a previous pass; and the compression passes cease to be performed when there is only one ciphertext returned as a result of a certain pass, wherein this one ciphertext encrypts a concatenation of all the ciphertexts in the list of ciphertexts that homomorphically encrypt non-zero values.

20. The computer program product of claim 18, wherein the compression is performed by iterating over the ciphertexts in the list of ciphertexts, wherein:

prior to a first iteration, an accumulator is initialized with the homomorphically-encrypted zero value;

in each iteration:

a respective ciphertext is homomorphically compared with the homomorphically-encrypted zero value, to return a result comprising one of the following ciphertexts: (a) a homomorphic sum of the respective ciphertext and a ciphertext in the accumulator if the respective ciphertext equals the homomorphically-encrypted zero value, and (b) a concatenation of the respective ciphertext and the ciphertext in the accumulator if the respective ciphertext is not equal to the homomorphically-encrypted zero value, and the accumulator is updated with the result, such that the accumulator includes a single ciphertext which is a compression of the ciphertexts iterated over so far; and when the iterations complete, the single ciphertext in the accumulator encrypts a concatenation of all the ciphertexts in the list of ciphertexts that homomorphically encrypt non-zero values.

* * * * *